United States Patent [19]
Davis

[11] Patent Number: 4,629,482
[45] Date of Patent: Dec. 16, 1986

[54] HEPA ROOM AIR PURIFIER

[75] Inventor: George B. Davis, Frederick, Md.

[73] Assignee: Enviracaire Corporation, Hagerstown, Md.

[21] Appl. No.: 762,345

[22] Filed: Aug. 5, 1985

[51] Int. Cl.[4] .............................................. B01D 46/52
[52] U.S. Cl. .................................... 55/385 A; 55/471; 55/472
[58] Field of Search .............. 55/385 A, 467, 471–473

[56] References Cited

U.S. PATENT DOCUMENTS

| | | | |
|---|---|---|---|
| 2,983,432 | 5/1961 | Tupper | 55/471 |
| 3,308,610 | 3/1967 | Springer et al. | 55/471 |
| 3,498,032 | 3/1970 | Scott | 55/471 |
| 3,936,284 | 2/1976 | Mason | 116/70 |
| 4,319,899 | 3/1982 | Marsh | 55/473 X |
| 4,321,070 | 3/1982 | Bede | 116/70 |
| 4,344,784 | 8/1982 | Deckas et al. | 55/385 A X |
| 4,427,427 | 1/1984 | DeVecchi | 55/472 X |
| 4,548,627 | 10/1985 | Landy | 55/385 A |
| 4,560,395 | 12/1985 | Davis | 55/385 A X |

FOREIGN PATENT DOCUMENTS

| | | | |
|---|---|---|---|
| 1158291 | 6/1958 | France | 55/482 |
| 1561978 | 3/1980 | United Kingdom . | |

OTHER PUBLICATIONS

Catalog: ATMOS-Tech Industries HCPA Filters.
Catalog: Bio-Tech 1982 (See Cleanaire 1212 & 300).
Catalog: Peris Industries (See Models 300B & 600).
Advertisement Vitaire High Efficiency Air Purifier, 2 pp.
Brochure Owners Manual EACI Enviracaire.
Catalog-Research Products Corp. "Air Cleaning".
"Design News", High-Efficiency Filter Units Clean .. . " 6-17-85, pp. 108–110 Circular No. 208.

Primary Examiner—Robert Spitzer
Attorney, Agent, or Firm—Dowell & Dowell

[57] ABSTRACT

Portable room air purifiers having replaceable and generally cylindrical high efficiency particulate air filters which are mounted to receive incoming air which is drawn therethrough by centrifugal fans positioned adjacent deflectors in such a manner that air is directed radially outwardly through generally annular exhaust openings in a quiet and yet highly efficient manner. The fans, air deflectors and exhaust openings are designed to create outlet air flow patterns which will give a positive physical indication that the air filters should be replaced. In one embodiment of the invention, the filter units are stackable so as to permit increased air flow rates without modifying the centrifugal fan or fan motor.

20 Claims, 7 Drawing Figures

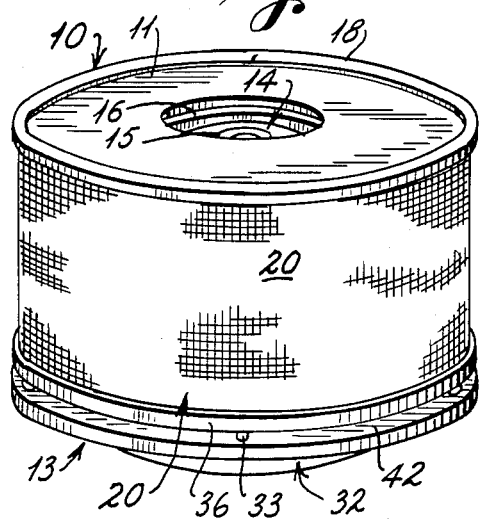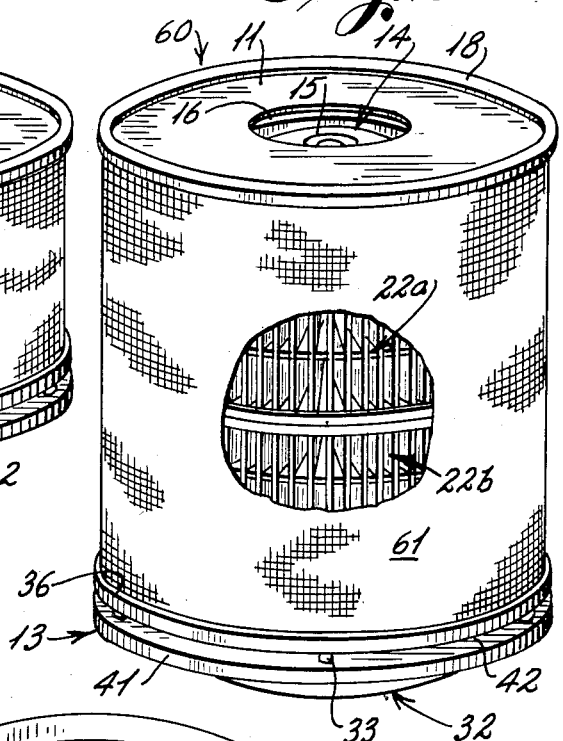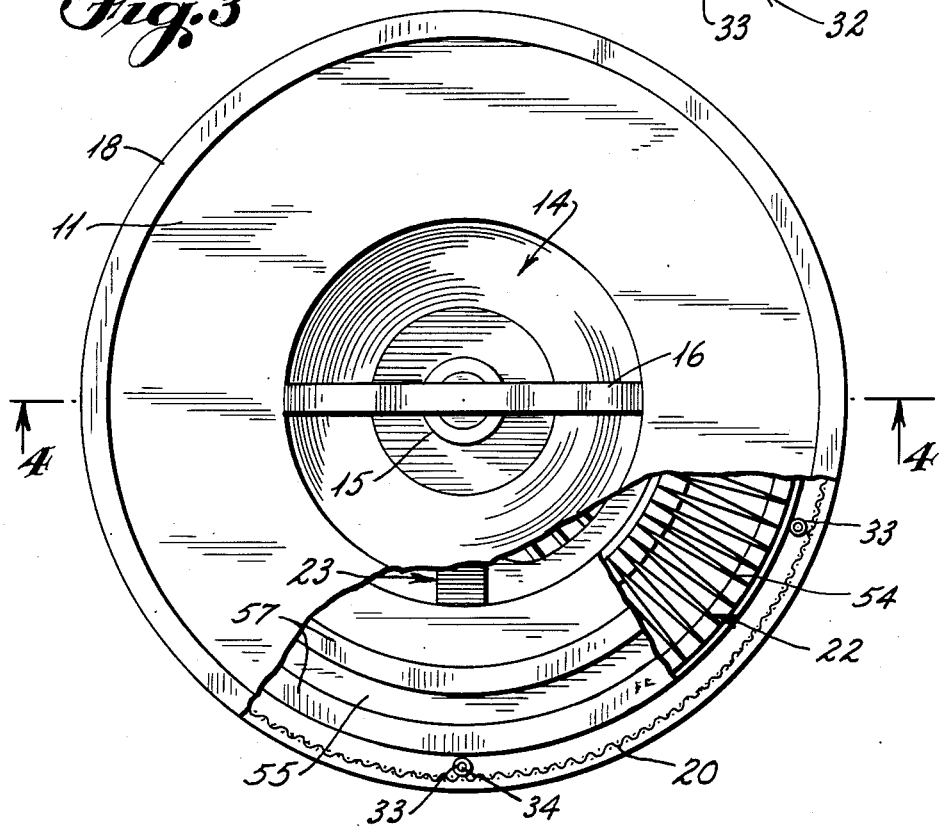

HEPA ROOM AIR PURIFIER

BACKGROUND OF THE INVENTION

1. Field of the Invention

This invention is generally directed to room air purifiers for use in removing smoke, dust, pollen, bacteria and other particulate matter from the air and particularly to portable air purifiers which utilize high efficiency particulate air (HEPA) filters which have an efficiency for removing 99.97% of the particles of a size 0.3 micron or larger from the air in a room. The purifiers are designed to maintain a flow rate of between approximately 150 to 400 cubic feet per minute with the lower rates applying when the filters have become clogged. The purifiers are designed so that the air flow therefrom will pulsate when such flow drops to a lower preselected rate to thereby provide a positive indication that the filters should be replaced. The filters are easily replaceable and may be combined in series or stacked relative to one another in order to increase the overall flow rate through the purifiers.

2. History of the Art

In recent years there has been a growing interest to improve environmental air conditions as the general ambient air has become more polluted. As more information is made available to the public concerning environmental conditions, there has been an increased demand for products which can be used to effectively improve air quality.

As the number of airborne pollutants continues to increase, the effects upon the public have resulted in an increased number of complaints of respiratory infections, burning eyes, allergies, athsma attacks and other symptoms which are directly related to air pollution. One only need to consider the types of airborne particles which are inhaled by the average person on a daily basis to understand that the problem with airborne pollutants is ever increasing and its side effects growing. People are constantly inhaling particles of dust, smoke, pollen, molds, acids, bacteria, carbon and the like. Because of this situation, it has become necessary in many environments, such as in hospitals, laboratories, scientific research rooms and the like, to provide filtering equipment which will remove a majority of these airborne pollutants.

Due to the ever increasing public awareness and the increasing problems resulting from air pollution, a great demand has been made for products which can be made available to the general public to provide for clean air conditions in homes and places of employment. Unfortunately, many of the products which have been advertised, distributed and sold for individual consumers have not been as effective as the equipment used in more commercial environments. There are numerous room air purifiers on the market today which are advertised as being portable and available for consumer use at home, at work or for travel. Many of these units are advertised as being effective to remove substantially all foreign particles from the air; a claim which cannot be supported through actual testing of such devices. Other available portable room air purifiers utilize filtering materials which are only useful for removing perhaps as much as 80-85% of the particles of one micron or larger from the air. Such units therefore do not provide relief against smaller particles such as contained in smoke and dust and also do not provide total relief from larger pollutants such as pollens and fungus spores.

In more recent years, it has been proposed to utilize electrostatic air filtration as a means for providing a more purified air environment. However, tests indicate that electrostatic air purifiers may not remove more than 80% of the particles that pass therethrough. In addition, the efficiency of such units decreases with larger particles and, therefore they do not provide adequate relief against plant pollens. Electrostatic air purification units also produce an ozone byproduct and create charged particles which are attracted to surfaces within a room.

Currently, some manufacturers have begun to make use of high efficiency particulate air filters and some of these manufacturers have made units available for the individual consumer. High efficiency particulate air filters are known as HEPA filters and are defined by federal standard No. 209 B. The general definition for HEPA filters by federal standard is "a filter as specified in MIL-F-51068 with a minimum efficiency of 99.97% as determined by tests". A recent proposal has been made to change the federal standard with regard to HEPA filters to read "a throw-away extended media dry-type filter in a rigid frame having minimum particle-collection efficiency of 99.97% for 0.3 micrometer thermally-generated dioctyl phthalate (DOP) (or specified alternative) aerosol particles, and a maximum clean filter pressure drop of 1.0 inch (2.54 cm) water gauge when tested at rated air flow capacity." The general industry definition of a HEPA filter is one which is efficient in removing 99.97% of the airborne particles of the size of 0.3 microns or larger.

The use of HEPA filters offers an advantage over prior art filter media in that the amount of airborne pollutants which can be effectively removed from the air is significantly increased. In addition, it has been found that HEPA filters last for longer periods of time and therefore offer cost savings to the consumer.

Although some HEPA filter room air purifiers are available for consumer purchase, many of these units do not provide sufficient air flow to be effective for use in a consumer's home and have limited use in very small, closed areas. It is necessary that a room air purifier create an air flow which will insure that all the air within a room is circulated through the filter media as often as possible to insure continuous removal of pollutants. This consideration is even more important when considering that centralized heating and air-conditioning systems continuously circulate contaminated air into the various areas of homes and/or office spaces.

Another consideration which has not been satisfactorily dealt with by prior art room air purifiers is that of informing the consumer when filter elements should be changed. Various prior art filters for other uses have incorporated special valving arrangements to create a whistling noise when the pressure drop through such filters reaches a certain level. In other prior art devices, electronic circuitry is used to sense the number of particles which pass through a filter media with a warning being given if the number of particles exceeds the predetermined number. In other strucures, the air flow rates from the air purifiers are used to determine if the filters should be replaced. The foregoing measures do not adequately rely on the condition of the filter itself to regulate information with regard to the need for filter replacement but rely on either expensive circuitry and electronics or valving arrangements to create audible sounds.

Another consideration which has not been appreciated by prior art portable room air purifiers is the need to make such units expansible to provide for varying air flow demand in different areas without requiring separate units of differing capacity to be placed in such areas. Also, many commercially available air purification units are somewhat large and bulky. A large size is often necessary to provide sufficient air filter surface area to adequately remove airborne particles from the air. On the other hand, some air purification units are purposely made smaller to be more portable, however, the volume of air which can be filtered by such units is appreciably reduced and therefore the overall efficiency of such units is decreased.

SUMMARY OF THE INVENTION

This invention is directed to portable room air purification units capable of producing clean air flow rates of 350 cubic feet per minute and up and which incorporate cylindrical HEPA filter elements which are mounted to filter air flowing into the units. Air flow is created by centrifugal fans mounted within dish shaped base members so as to direct air outwardly through specially oriented and sized exhaust openings in a non-turbulent manner. In the event air filters become clogged or need replacement, the reduction of air flow through the filters will cause air to be drawn intermittently through the exhaust openings thereby creating a pulsation of air which is a positive indication that the filter should be repaced. The units are also designed to be enlarged to provide greater air flow capacity by stacking interfitting filter elements in vertical relationship within the units.

It is the primary object of this invention to provide portable room air purifiers which may be economically operated and which include HEPA filter elements which will remove 99.97% of airborne particulate matter of 0.3 microns or larger including smoke, pollen, dust, bacteria and the like.

It is another object of the present invention to provide HEPA filter room air purifiers wherein the filter elements utilized therein are constructed in a pleated cylindrical configuration so as to increase the effective filter area over conventional planar or corrugated filter medias.

It is yet another object of the present invention to provide room air purifiers which will automatically provide an indication that the filter elements incorporated therewith have become clogged or need replacing without requiring complicated and expensive electronic sensors.

It is a further object of the present invention to provide room air purifiers of a relatively small size which will develop flow rates of 350 to 400 cubic feet per minute and which will automatically respond to reduced flow rates of 150 to approximately 200 cubic feet per minute caused by filter clogging to pulsate air at the area of discharge and thereby indicate that a filter change is required.

Another object of the present invention is to provide light weight room air purifiers which can be expanded by the addition of additional interfitting filter elements without requiring larger or more powerful fan and motor assemblies.

It is also an object of the present invention to provide portable air purification units which incorporate high efficiency particulate air filters and which are more economically produced and achieve substantially greater air flow rates than conventional room air purifiers.

BRIEF DESCRIPTION OF THE DRAWINGS

FIG. 1 is a perspective view of a single filter air purifier unit of the present invention.

FIG. 2 is a perspective view of a stackable filter air purifier unit of the present invention.

FIG. 3 is an enlarged top plan view of the room air purifier of FIG. 1 having portions broken away to show the upper gasket area of the HEPA filter element and a partial cross-section of the HEPA filter material.

DESCRIPTION OF THE PREFERRED EMBODIMENT

Figure 4:
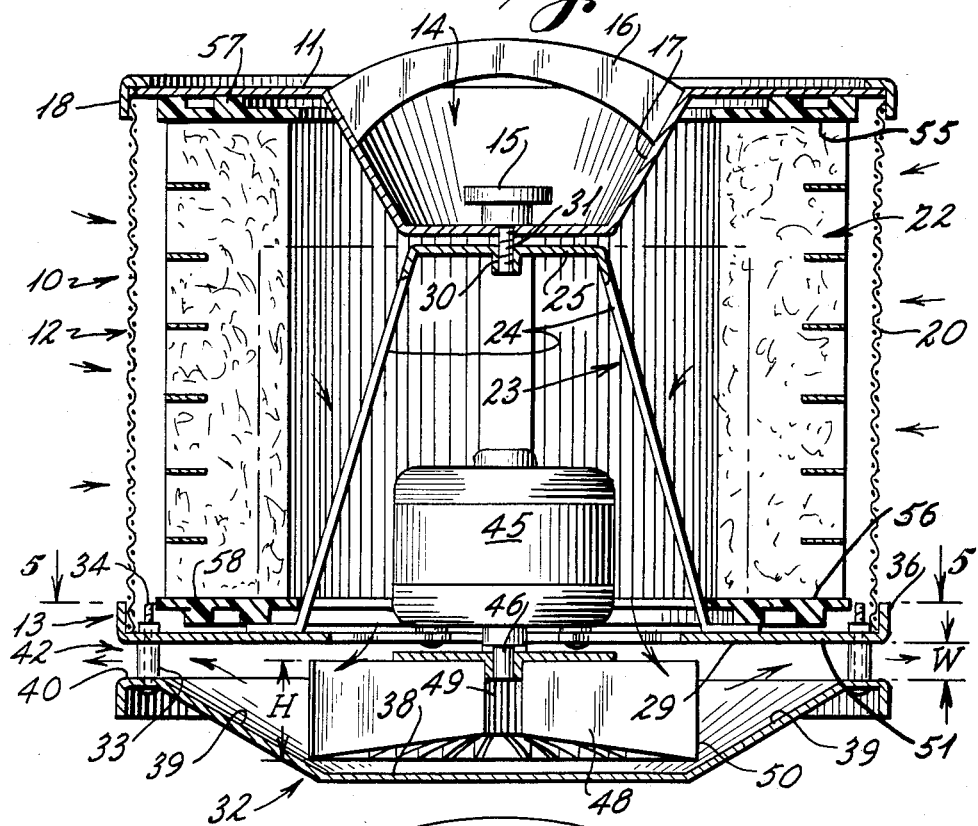
FIG. 4 is an illustrational cross-sectional view taken along lines 4—4 of FIG. 3 showing by arrows the air flow through the air purifier.

With continued reference to the drawings, the air purification unit 10 of the present invention is shown in FIG. 1 as being generally cylindrical in configuration and having a removable lid or cover 11, body portion 12 and base portion 13. The lid 11 of the unit is shown as having a generally centrally disposed recessed area 14 in which a screw-threaded locking member or knob 15 is disposed. A carrying handle 16 is mounted having its ends 17 secured to the tapered side walls of the recessed area 14. The lid is generally circular in configuration and has a downwardly extending annular flange 18 extending around the circumference thereof. The downwardly extending flange 18 cooperatively engages the upper area of the body portion 12 of the purification unit as shown in FIG. 4.

With continued reference to FIG. 4, the body of the air purification unit 10 is defined by a cylindrical perforated screen 20 which extends between the lid 11 and the base 13. Mounted inwardly of the screen, is a generally cylindrical HEPA filter element 22 which surrounds a lid mounting frame 23.

The lid mounting frame 23 includes a plurality of upwardly extending bracket members 24 which are joined at their upper ends to a generally horizontally disposed plate member 25. The lower ends of the bracket members extend outwardly to foot or flanged portions 28 which are supported by an upper plate 29 of the base portion 13 of the air purification unit. An opening 30 is provided in the central portion of the plate 25 and serves to threadingly receive the threaded end portion 31 of the locking knob 15 so that the locking knob may be adjustably tightened with respect thereto thereby drawing the lid 11 of the purification unit into tightly fitted engagement over the body portion 13 and HEPA filter element 22 of the unit.

The base portions of the air purification units of the present invention are defined having the upper plate portions 29 which are mounted in spaced relationship with respect to lower air deflector dishes or plates 32 by a plurality of spacer sleeves 33 and locking bolts 34 which are carried within the sleeves. The outer edges of the upper plates 29 are shown as having integrally formed and upwardly extending annular flanges 36 which cooperatively engage the lowermost portions of the cylindrical screens 20 which define the body portions of the purification units. The spacer sleeves 33 are positioned so that the bolts 34 extending therethrough are disposed inwardly of the upwardly extending flange portions 36 of the upper base plates 29.

The air deflector dishes are shown as being generally concave elements including generally planar lower walls 38 and outwardly and upwardly extending conical side walls 39 which may be integrally formed with a generally outwardly extending ring portion 40. The rings or flanges 40 have a depending annular flange 41 formed on the outer edges thereof. The depending flange portions of the deflector plates or dishes form a decorative rim or trim piece which will obscure the ends of the locking bolts 34.

The space created between the outermost or ring portions of the deflector plates and the upper base plates of the base portions of the purification units define generally annular air exhaust openings 42 through which air passing through the purification units is directed after being filtered through the filter elements 22.

Figure 5:
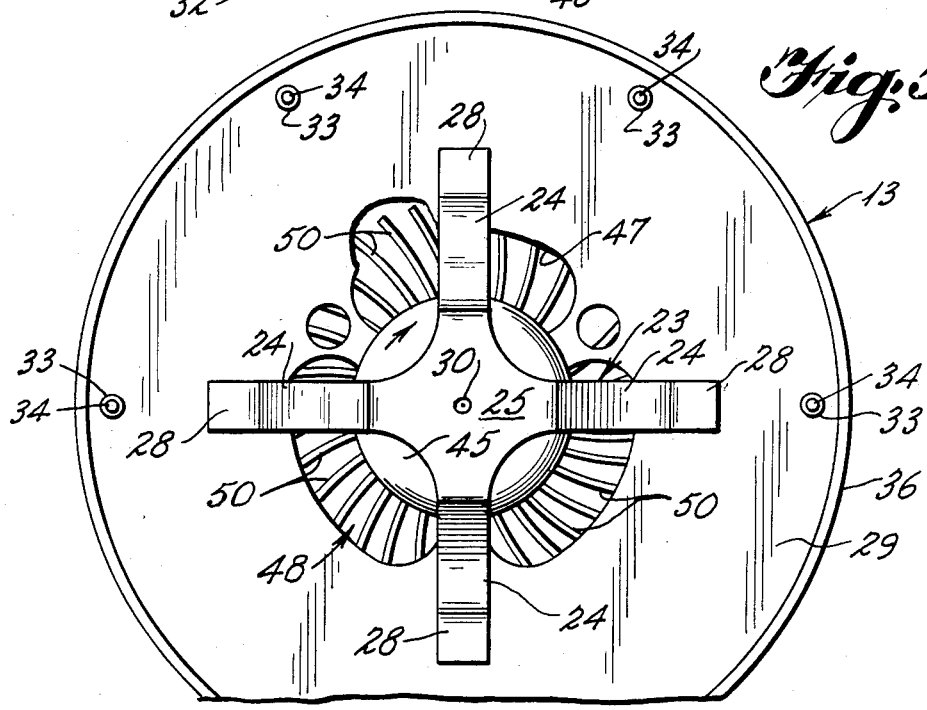
FIG. 5 is a partial cross-sectional view taken along lines 5—5 of FIG. 4.

In order to draw air through the air purification units of the present invention, relatively small horsepower motors 45 are attached to the upper plates 29 of the base portions 13 so as to extend generally centrally thereof and upwardly into the area encircled by the filter elements 22. The motor drive shaft 46 extends downwardly through openings 47 which are created through the central portions of the upper plates of the base members as shown in FIG. 5. Such openings 47 permit air flow to be established downwardly into the air deflector portion 32 of the base from the HEPA filter elements 22.

To generate a movement of air through the purification units of the present invention, each unit includes a centrifugal fan 48 which is mounted having its central hub 49 secured to the drive shaft 46 which extends from the motor 45. The centrifugal fans include a plurality of radially extending and equally spaced blades 50 which are slightly curved along their length as shown in FIG. 5. The blades are generally coextensive with and parallel to the planar lower wall 38 of the base portion of the unit.

Through testing, it has been determined that the relationship between the fan blade 50, the air deflector dish 32 and the exhaust openings 42 are critical. With continued reference to FIG. 4, the conical side walls 39 of the air deflector dish extend upwardly and outwardly with respect to the fan blades. The inclined side walls 39 should extend upwardly and terminate at a point which is over one-half of the height of the blades as shown at H. Preferrably the side walls should extend upwardly approximately to a point which will cause the outwardly extending ring or flange portion 40 of the deflector dish to be aligned with the blades at about two-thirds to three-fourths of their height. The relationship between the conical side walls of the deflector dish and the fan blades will create exhaust openings 42 which are generally horizontally aligned with the upper one-third to one-quarter portion of the fan and fan blades. Additionally, the uppermost portions of the fan should be spaced immediately below the underside 51 of the upper base plate 29. With the foregoing relationship, the exhaust openings 42 will be appropriately spaced in alignment with the fan blades 50 and will be of a size or width W to permit a non-turbulent air flow therethrough when the fan is exhausting air at the desired flow rate for the unit which flow rate should be approximately 150 to 400 cubic feet per minute.

Due to the design characteristics of the exhaust openings 42, the air purification units of the present invention offer a unique and high desirable physical and audible indication that the units are operating at a flow rate below the desired rate. Such automatic indications may thus be utilized to alert consumers or users of the units that the air filter elements 22 should be replaced. Specifically, as the exhaust openings are properly oriented and sized to permit a non-turbulent air flow during normal unit operation, should the air flow begin to drop below a desired level, the air exhausting from the unit will begin to pulsate. The pulsating exhausting air can both be audibly heard as well as visually observed by placing a piece of cloth, ribbon, paper or the like adjacent the exhaust openings 42. The cloth or other material will move rapidly inwardly and outwardly with respect to the exhaust openings thereby reflecting the pulsation of the exiting air. The pulsation of air is created as the filters 22 become clogged and restrict the air flow therethrough below a desired rate. When this reduction in air flow rate into the units is experienced, the fans will begin to alternate exhaust and draw air from and into the exhaust openings thereby creating a pulsation effect which will alert persons using the units to repace the filter elements.

By way of example, a prototype air purification unit was constructed utilizing a one-thirtieth (1/30) hp. motor and $8\frac{3}{4}'' \times 2''$ fan. The outlet or exhaust opening had a width W of one-half inch. The HEPA filter 22 created an effective surface area of approximately 40 sq. ft. The motor was rated at 115 volt, 1.3 amp (150 watts) with 1050 RPM. The air flow rate with a clean filter installed was measured at the exhaust openings at approximately 350 cubic feet per minute. The exhaust air flow was non-turbulent. The air filter was then selectively clogged until the exhaust air began to pulsate. The exhaust air flow rate was again measured and determined to be approximately 150 cubic feet per minute. In prior testing, when the exhaust opening was enlarged for example to a width W of one inch, the air flow with a clean filter was turbulent and therefore not acceptable.

With reference to FIGS. 3 and 4 of the drawings, the HEPA filter elements 22 are shown as being constructed having a plurality of vertically extending pleated portions 54. These pleats increase the effective surface area of the elements over a filter having a smooth or continuous circumferential surface area. For example, a filter having a two square feet outer surface area will have an effective surface area of approximatey 40 square feet when pleated. The filters also have upper and lower ends or surfaces 55 and 56 which are formed of a resilient or elastormeric material.

In order to provide an air tight seal between the filters 22 and the lid 11 and upper base plate 29, each end of filter includes a pair of spaced annular upstanding ribs or seals 57 and 58. The lower ribs 58 engage the upper base plate forming an air tight seal therebetween while the ribs 57 form an air tight seal with the cover or lid. The lower ribs 58 are shown as being inwardly offset in vertical alignment with respect to the upper ribs 57 in order to permit the filters to be stacked upon one another for reasons which will be discussed hereinafter.

Figure 6:
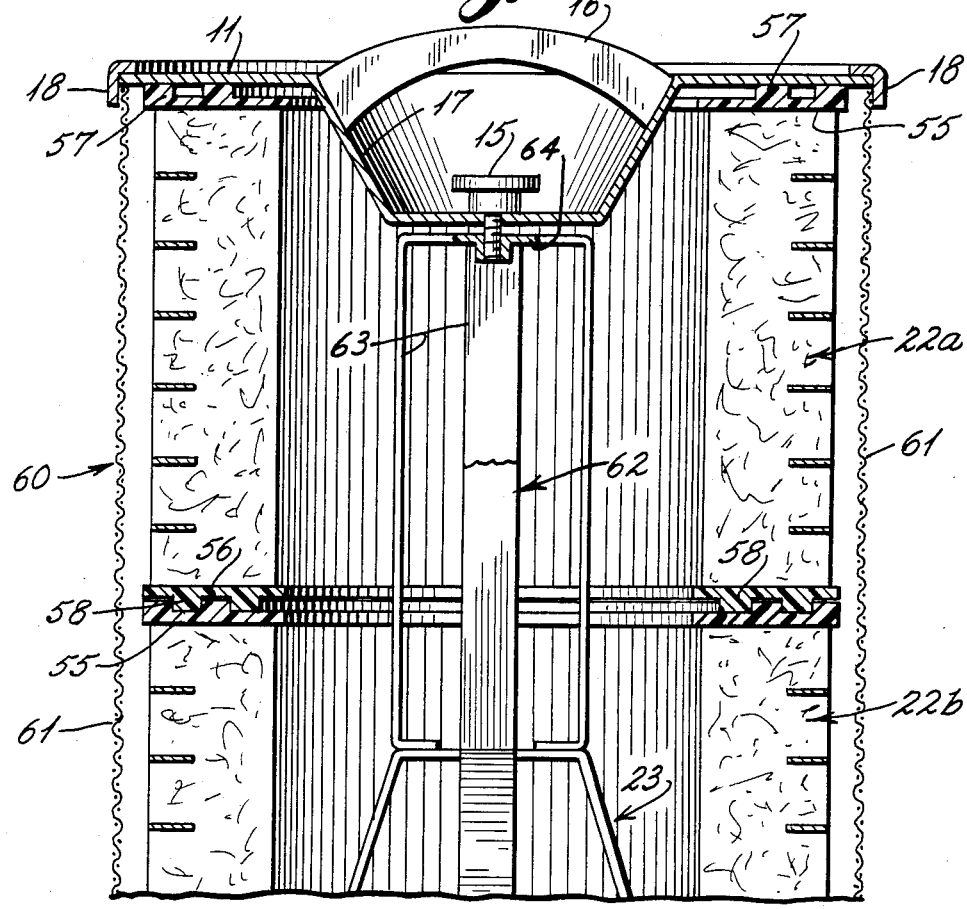
FIG. 6 is an enlarged partial cross-sectional view of the embodiment of air purification unit shown in FIG. 2 showing the mounting relationship between the stackable air filters.

The air purification units of the present invention may be easily and quickly modified to create increased air flow rates. The increased air flow rates may be achieved utilizing most of the unit components discussed above. With particular reference to FIGS. 2 and 6, an enlarged air purification unit 60 is shown. The enlarged unit includes the same lid 11 and base 13. As opposed to a single cylindrical HEPA filter element 22, however, the enlarged units incorporate a pair of filters 22a and 22b which are mounted in vertically stacked relationship. The body portions 61 of the enlarged or expanded purification units are constructed of a porous screen material formed into an elongated cylinder which are seated between the lid and base as previously described with respect to the body portions 12 of the single filter units.

The enlarged units 60 utilize the same motor, fan assembly and air deflector as described above with respect to the single filter units 10. In order to mount the lids in tightly fitted engagement with the upper filters 12a, supplemental lid mounting brackets 62 are attached to the horizontal plates 26 carried by the lid mounting frames 23. As shown in the drawings, the supplemental lid mounting brackets 62 are constructed similarly to the frames 23 and include vertically extending leg members 63 which are joined at their upper ends to locking plates 64. The locking plates 64 have threaded openings centrally thereof in which the threaded end portion 31 of the locking knob 15 is cooperatively received.

As discussed above, each HEPA filter element 22 includes a pair of offset upper and lower seals or ribs 57 and 58 respectively. With particular reference to FIG. 6, the size and spacing between the ribs permits the lower seals or ribs of filter element 22a to be cooperatively interfitted or interlocked between or adjacent to the upper seals or ribs of filter element 22b. The interfitted engagement between the stacked filter elements will form an air tight seal therebetween when the purification units 60 are in use.

From the foregoing, the basic air purification units 10 may be easily converted to larger units 60 requiring few changes in components. The enlarged units, when incorporating the motor and fan discussed above with respect to a 350 cubic feet per minute unit will develop an air flow rate of 400 cubic feet per minute. To further facilitate convertability of the units, the cylindrical screens 20 which define the bodies 12 of the units 10 may be constructed so as to be stackable upon one another thereby enabling the larger screen or body 61 to be formed of a pair of stacked screens 20 (not shown).

Figure 7:
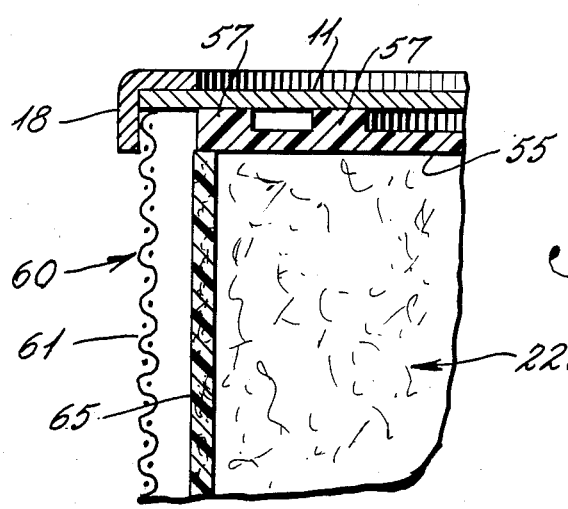
FIG. 7 is an enlarged partial cross-sectional view of the upper air filter shown in FIGS. 2 and 6 having an optional prefilter element mounted adjacent thereto.

A further modification of the units 10 and/or 60 of the invention is shown in FIG. 7. In this embodiment, a cylindrically shaped prefilter element 65 may be selectively placed over the surface of the HEPA filters 22. The prefilter may be used to remove larger airborne particles from the air before such particles engage the HEPA filters. Preferrably the prefilters are constructed of a washable material so that such filters can be cleaned for reuse. Also such prefilters are of a size to cooperatively engage the exterior surface of the HEPA filters so that no additional support structure is necessary to retain the prefilters in place.

Utilizing the size of motor and fan assembly discussed above and with HEPA filters measuring approximately 14½" (outside diameter) and 8¾" (inside diameter)×8" in height, the overall dimensions of a 350 cubic feet per minute purifier unit 10 will be approximately 11" high×16" in diameter. Therefore, the air purification units not only offer a good air filtration rate but are compact in size. Further, as the components may be formed of light weight materials, the units will be easily transported or moved. The weight of the prototype model discussed above was 15½ pounds.

Another function of the present invention is that the purifications units may be suspended from a ceiling in the event it is desired to move the units to provide extra floor or countertop space. Also, although not shown in the drawings, the air purification units may be equipped with electronic speed controls to regulate the operation of the motor to adjust the air flow rate through the purifiers.

I claim:

1. A portable air purification apparatus comprising a housing including a base portion and cover means, said base portion including an air deflectin means and a plate means mounted in spaced relationship to said air deflection means so as to create a substantially continuous air exhaust opening therebetween, a centrifugal fan means disposed between said plate means and said air deflection means and being mounted so as to direct air radially outwardly therefrom through said air exhaust opening, at least one opening through said plate means to permit air flow therethrough to said centrifugal fan means, motor means carried by said base portion and extending upwardly with respect to said opening in said plate means, said motor means having drive shaft means for driving said centrifugal fan means, air filter means mounted between said base portion and said cover means so that air is drawn therethrough toward said centrifugal fan means, and means for securing said cover means relative to said base means to thereby retain said air filter means therebetween.

2. The air purification apparatus of claim 1 in which said centrifugal fan means includes a plurality of radially extending blade means having heights as measured between said air deflection means and said plate means, said air deflection means having generally conical side wall portions which extend toward said plate means and outwardly with respect to said blade means of said centrifugal fan means so as to define a recessed area, said blade means of said centrifugal fan means being partially disposed within said recessed area so that no more than approximately one-third of the height of said fan blade means extend outwardly of said recessed area and toward said plate means.

3. The air purification apparatus of claim 2 in which said exhaust opening is defined having a width as measured between the plate means and the outermost edge of said conical side walls which is not greater than approximately one quarter to one third of the height of said fan blade means.

4. The air purification apparatus of claim 3 including a bracket means extending between said plate means of said base portion and said cover means, and said means for securing said base portion being selectively and adjustably engageable with said bracket means.

5. The air purification apparatus of claim 4 in which said air filter means includes first and second ends, first and second air seal means carried by said first and second ends of said air filter means respectively, said first air seal means being engageable with said cover means and said second air seal means being engageable with said plate means to thereby seal said air filter means in airtight engagement therebetween.

6. The air purification apparatus of claim 5 in which said air filter means is a generally cylindrical HEPA filter constructed having a plurality of radially extending pleated surface portions.

7. The air purification apparatus of claim 6 in which said cover means includes a generally centrally located recessed portion, said means for securing said cover means with respect to said filter means including a locking knob means mounted within said recess portion of said cover means, and handle means carried by said cover means.

8. The air purification apparatus of claim 7 including generally cylindrical screen means extending around said air filter means and between said cover means and said base means.

9. The air purification apparatus of claim 8 in which said first and second air seal means are annular ribs which are radially offset with respect to one another.

10. The air purification apparatus of claim 9 including two air filter means selectively mounted in stacked relationship with respect to one another, said ribs of said air filter means being interfitted with respect to one another so as to create an air tight seal therebetween with said first air seal means of one of said air filter means being adjacent said second air seal means of the other of said air filter means.

11. The air purification apparatus of claim 1 in which said air deflection means includes generally tapering and conically shaped side walls which extend outwardly of said centrifugal fan means and toward said plate means, said centrifugal fan means including a plurality of blade means which extend outwardly with respect to said drive shaft means toward said exhaust opening, said exhaust opening having a substantially continuous width as measured between said plate means and said side walls of said air deflector means, said width of said opening being of a size so that the air flow therethrough will be substantially non-turbulent when the air flow through said filter means is above a predetermined minimum and such that the air flow therethrough will pulsate when the air flow through said filter means falls below said minimum.

12. The air purification apparatus of claim 11 in which said minimum air flow rate is between 150 to 200 cubic feet per minute.

13. The air purification apparatus of claim 12 in which said air filter means is generally cylindrical in configuration having a purality of radially extending pleated portions.

14. The air purification apparatus of claim 13 in which said filter means is a HEPA filter.

15. A portable room air purification apparatus comprising a base, a generally tubular filter means carried by said base, cover means for securing said air filter means to said base, said base including a plate means and an air deflector means mounted in spaced relationship with respect to one another, at least one opening through said plate means so as to permit air flow from said air filter means therethrough, a motor means carried by said base, centrifugal fan means mounted in driven relationship to said motor means and positioned between said plate means and said air deflection means, said air deflector means including a recessed area defined by side walls which extend toward said plate means and outwardly with respect to said centrifugal fan means, said centrifugal fan means being at least partially disposed within said recessed area and having a plurality of blades extending radially outwardly from a central hub portion so as to direct air radially outwardly thereof, an exhaust opening between said plate means and said air deflection means so as to be in generally radial alignment with a portion of the blades of said centrifugal fan means, said exhaust opening being defined by a width W between said plate means and said side walls of said air deflection means which will create a pulsation of air passing therethrough when the air flow through said filter means is below a predetermined minimum.

16. The air purification apparatus of claim 15 in which said air flow rate through said air filter means is generally 350 to 400 cubic feet per minute and in which said minimum air flow rate is generally between 150 to 200 cubic feet per minute.

17. The air purification apparatus of claim 15 in which said air filter means is a generally cylindrical HEPA filter having a plurality of pleated portions extending radially outwardly thereof.

18. In a portable room air purification unit having a housing in which a filter element is mounted so that a motor driven fan means will urge air through the filter element the improvement comprising, said housing having a base portion, the fan means being a centrifugal fan having a plurality of radially extending blades which are mounted within said base of the housing, said base having a peripheral substantially continuous opening therethorugh which is generally radially aligned with said fan blades and which forms an exhaust outlet from the housing, said opening being of a width to initiate pulsation of the air flow therethrough when the air flow through the filter element falls below a predetermined minimum.

19. A portable air purification apparatus comprising a housing including a base portion and cover means, said base portion including an air deflection means and a plate means mounted in spaced relationship to said air deflection means so as to create an air exhaust opening therebetween, a centrifugal fan means disposed between said plate means and said air deflection means and being mounted so as to direct air radially outwardly therefrom through said air exhaust opening, at least one opening through said plate means to permit air flow therethrough to said centrifugal fan means, motor means mounted adjacent said opening in said plate means, said motor means having drive shaft means for driving said centrifugal fan means, at least one air filter means mounted between said base portion and said cover means so that air is drawn therethrough toward said centrifugal fan means, said air filter means including a HEPA filter element, and means for securing said cover means relative to said base means to thereby retain said air filter means therebetween.

20. The portable air purification apparatus of claim 19 in which said air filter means is a generally hollow filter element which includes first and second ends, first and second air seal means carried by said first and second ends of said air filter means respectively, said air seal means being engageable with said cover means and said second air seal means being engageable with said plate means to thereby seal said air filter means in airtight engagement therebetween.

* * * * *